(12) United States Patent
Siebens et al.

(10) Patent No.: US 9,444,176 B2
(45) Date of Patent: Sep. 13, 2016

(54) ELECTRICAL CONNECTOR HAVING COLD SHRINK COMPONENT

(71) Applicant: Thomas & Betts International, LLC, Wilmington, DE (US)

(72) Inventors: Larry N. Siebens, Asbury, NJ (US); Daniel L. Gardner, Collierville, TN (US); Carlos H. Hernandez, Germantown, TN (US); Kieran P. Higgins, Great Meadows, NJ (US)

(73) Assignee: Thomas & Betts International, LLC, Wilmington, DE (US)

( * ) Notice: Subject to any disclaimer, the term of this patent is extended or adjusted under 35 U.S.C. 154(b) by 111 days.

(21) Appl. No.: 14/280,114

(22) Filed: May 16, 2014

(65) Prior Publication Data

US 2015/0004843 A1    Jan. 1, 2015

Related U.S. Application Data

(60) Provisional application No. 61/841,100, filed on Jun. 28, 2013.

(51) Int. Cl.
*H01R 4/58* (2006.01)
*H01R 13/504* (2006.01)
(Continued)

(52) U.S. Cl.
CPC ............ *H01R 13/504* (2013.01); *H01R 13/53* (2013.01); *H02G 15/064* (2013.01); *H02G 15/182* (2013.01); *H02G 15/1833* (2013.01); *Y10T 29/4922* (2015.01)

(58) Field of Classification Search
CPC ........................... H01R 13/53; H01R 13/6485
USPC ...................... 439/88, 181, 625, 921
See application file for complete search history.

(56) References Cited

U.S. PATENT DOCUMENTS 3,323,097 A * 5/1967 Tordoff .................. H01R 13/53
                                                    174/73.1
3,509,516 A * 4/1970 Phillips .................. H01R 13/53
                                                    174/18

(Continued)

FOREIGN PATENT DOCUMENTS

EP        0209384 A2    1/1987
JP        6111864 A     4/1994

(Continued)

OTHER PUBLICATIONS

Taiwan Office Action, 103122249, Thomas & Betts International, Inc., Jun. 23, 2016.

*Primary Examiner* — Hae Moon Hyeon
(74) *Attorney, Agent, or Firm* — Taft Stettinius & Hollister LLP

(57) ABSTRACT

An electrical connector assembly configured to couple a power cable and at least one other electrical component, includes a housing body that includes a outer jacket, an insert portion, and an insulative inner housing positioned between at least a portion of the outer jacket and the insert portion. The housing body forms at least one bore for receiving the power cable. The outer jacket comprises a cable receiving jacket portion and a main body jacket portion. At least a portion of the cable receiving jacket portion is configured to engage the power cable received into the housing body. The cable receiving jacket portion comprises a cold shrink material configured to securely engage the power cable upon and the main body jack portion comprises a non-cold shrink material.

15 Claims, 12 Drawing Sheets

(51) Int. Cl.
*H01R 13/53* (2006.01)
*H02G 15/064* (2006.01)
*H02G 15/18* (2006.01)

(56) References Cited

U.S. PATENT DOCUMENTS

| | | | |
|---|---|---|---|
| 4,222,625 A | 9/1980 | Reed | |
| 4,629,277 A * | 12/1986 | Boettcher | H01R 4/72 |
| | | | 439/181 |
| 4,946,393 A * | 8/1990 | Borgstrom | H01R 13/53 |
| | | | 324/122 |
| 5,082,449 A * | 1/1992 | Borgstrom | H01R 13/53 |
| | | | 439/190 |
| 5,230,640 A * | 7/1993 | Tardif | H01R 13/53 |
| | | | 174/88 C |
| 5,467,515 A | 11/1995 | Luzzi | |
| 5,492,740 A * | 2/1996 | Vallauri | B29C 61/065 |
| | | | 174/73.1 |
| 5,801,332 A | 9/1998 | Berger et al. | |
| 5,857,862 A | 1/1999 | Muench et al. | |
| 6,111,200 A | 8/2000 | De Schrijver et al. | |
| 6,790,063 B2 * | 9/2004 | Jazowski | H01R 13/5205 |
| | | | 439/181 |
| 6,796,820 B2 | 9/2004 | Jazowski et al. | |
| 6,811,418 B2 | 11/2004 | Jazowski et al. | |
| 6,905,356 B2 | 6/2005 | Jazowski et al. | |
| 7,104,822 B2 | 9/2006 | Jazowski et al. | |
| 7,104,823 B2 | 9/2006 | Jazowski et al. | |
| 7,351,082 B2 | 4/2008 | Jazowski et al. | |
| 7,431,599 B2 | 10/2008 | Luzzi | |
| 7,476,114 B1 | 1/2009 | Contreras | |
| 7,511,222 B2 | 3/2009 | Taylor et al. | |
| 7,863,521 B2 | 1/2011 | Campbell et al. | |
| 7,878,849 B2 | 2/2011 | Hughes et al. | |
| 8,043,102 B2 * | 10/2011 | Lu | H01R 13/53 |
| | | | 439/181 |
| 8,109,776 B2 | 2/2012 | Hughes et al. | |
| 8,152,547 B2 | 4/2012 | Hughes | |
| 8,454,376 B1 * | 6/2013 | Siebens | H01R 43/002 |
| | | | 439/181 |
| 9,054,471 B2 * | 6/2015 | Hosler, Sr. | H01R 24/542 |
| 2004/0102091 A1 | 5/2004 | Jazowski et al. | |
| 2005/0227522 A1 | 10/2005 | Luzzi | |
| 2009/0215299 A1 | 8/2009 | Hughes et al. | |
| 2010/0200265 A1 | 8/2010 | Lu et al. | |
| 2010/0261383 A1 | 10/2010 | Su | |
| 2010/0279543 A1 | 11/2010 | Nguyen et al. | |
| 2012/0273246 A1 | 11/2012 | Luzzi | |
| 2014/0315447 A1 * | 10/2014 | Madden | H02G 15/1826 |
| | | | 439/730 |

FOREIGN PATENT DOCUMENTS

| | | |
|---|---|---|
| JP | 2529335 B2 | 8/1996 |
| JP | 2529335 | 12/1998 |
| JP | 2000058184 A | 2/2000 |
| JP | 2010027231 A | 2/2010 |
| JP | 2010539874 A | 12/2010 |
| JP | 2011185294 A | 9/2011 |

* cited by examiner

ELECTRICAL CONNECTOR HAVING COLD SHRINK COMPONENT

CROSS-REFERENCE TO RELATED APPLICATION

This application claims priority under 35 U.S.C. §119, based on U.S. Provisional Patent Application No. 61/841,100, filed on Jun. 28, 2013, the disclosure of which is hereby incorporated by reference herein.

BACKGROUND OF THE INVENTION

The present invention relates to electrical cable connectors, such as loadbreak and deadbreak high voltage elbow connectors. More particularly, aspects described herein relate to an electrical cable connector that includes one or more cold shrink components to facilitate secure, watertight connection with connected power cables.

Loadbreak connectors used in conjunction with 15 and 25 kilovolt switchgear generally include a power cable elbow connector having one end adapted for receiving a power cable and another end adapted for receiving a loadbreak bushing insert or another switchgear device. The end adapted for receiving the bushing insert generally includes an elbow cuff for providing an interference fit with a molded flange on the bushing insert.

In some implementations, the elbow connector may include a second opening formed opposite to the bushing insert opening for facilitating connection of the elbow connector to the bushing and to provide conductive access to the power cable by other devices, such as a surge arrestor, a tap plug, etc.

DETAILED DESCRIPTION OF THE PREFERRED EMBODIMENTS

The following detailed description refers to the accompanying drawings. The same reference numbers in different drawings may identify the same or similar elements.

One or more embodiments disclosed herein relate to a power cable connector, such as an elbow or T-connector having one or more cold shrink components. More specifically, the connector may include a housing configured to receive and secure a power cable to the connector.

Consistent with embodiments described herein, the power cable receiving body includes an outer jacket formed of a cold shrink material. In contrast, the outer jacket of the elbow body is formed of a conventional, non-cold shrink material. During manufacturing, the power cable receiving body is coupled to the elbow body, an insert is positioned within the combined outer jackets of the power cable receiving and elbow bodies, and a cold shrink insulator is injected therebetween to create the connector.

Prior to field dissemination of the connector, a tubular, expanded, removable core is inserted through the power cable receiving body. The core is configured to expand the axial opening through the power cable receiving body (e.g., though the insulator and jacket) to provide sufficient room to insert a prepared end of a power cable into the connector. Consistent with embodiments described herein, the size of the core is sufficient to receive power cables having a number of different sizes.

During installation of the connector, a prepared power cable is inserted through the core and into the connector. Once the power cable is fully inserted into the connector, the core is removed, thus allowing the power cable receiving body to collapse inwardly to secure the power cable within the connector. The connector may then be attached to an equipment bushing or similar device via the elbow body By forming the cable connector described herein with two distinct portions having different cold shrink performance levels, the connector is able to achieve desirable performance while simultaneously balancing costs.

Figure 1:
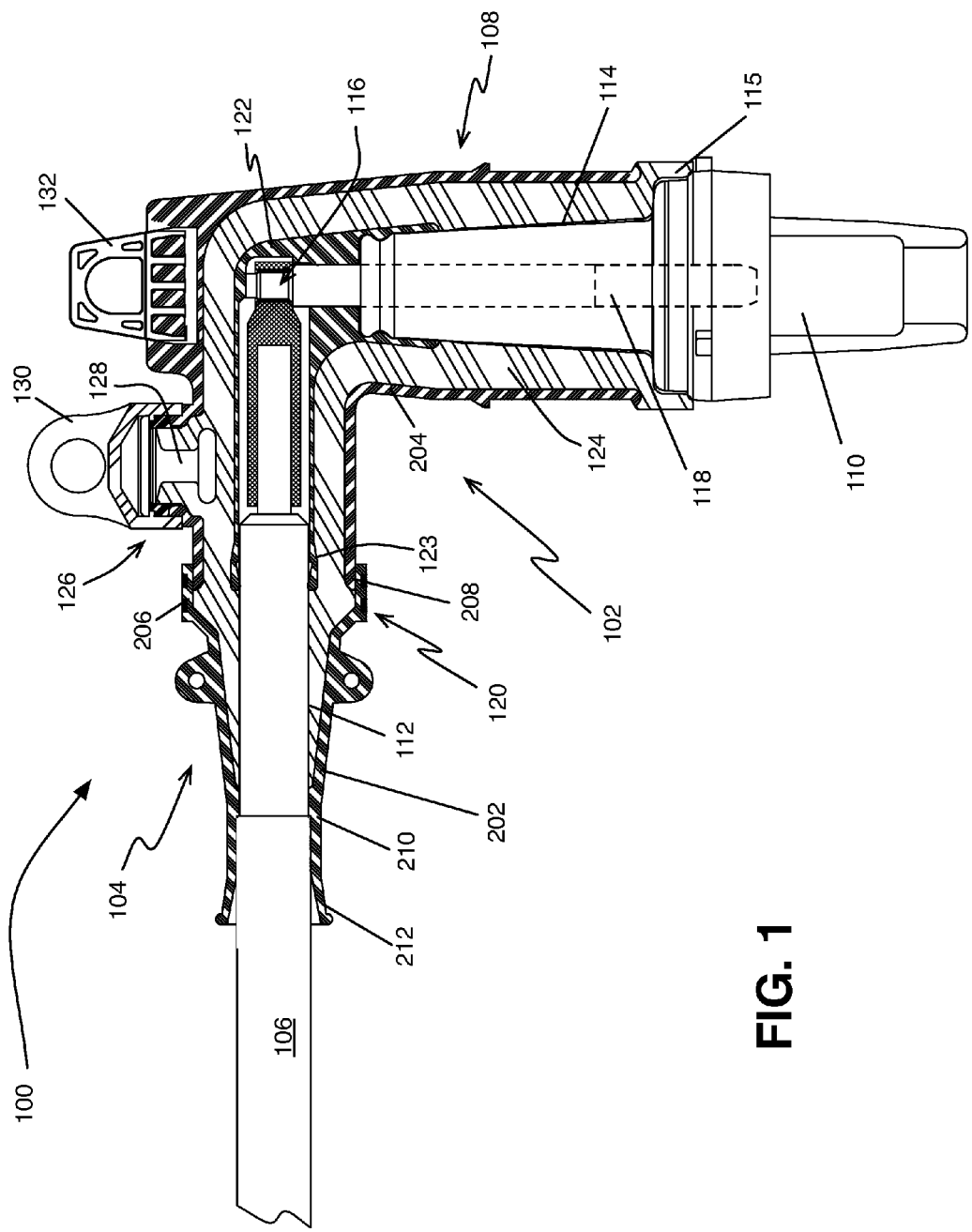
FIG. 1 is a schematic cross-sectional diagram illustrating a power cable elbow connector configured in a manner consistent with implementations described herein.

FIG. 1 is a schematic cross-sectional diagram illustrating a power cable elbow connector 100 configured in a manner consistent with implementations described herein. FIGS. 2-7 are side, cross-sectional views of elbow connector 100 during various stages of manufacture and installation. As shown in FIG. 1, power cable elbow connector 100 may include 200-amp elbow connector having a main housing body 102 and that includes a cable receiving end 104 for receiving a power cable 106 therein and a connector end 108 that includes an opening for receiving an equipment bushing, such as a deadbreak or loadbreak transforming bushing 110 or other high or medium voltage terminal.

As shown, cable receiving end 104 may extend along a main axis of connector 100 and may include a bore 112 extending therethrough. In some implementations, connector end 108 may project substantially perpendicularly from the axial direction of cable receiving end 104. Connector end 108 includes a bore 114 formed therethrough for receiving equipment, bushings, etc. A contact area 116 may be formed at the confluence of bores 112 and 114 for enabling power cable 106 to conductively couple to bushing 110, such as via a bushing stud 118, as shown in FIG. 1.

Power cable elbow connector 100 may include an electrically conductive outer jacket 120 formed from, for example, a conductive (or semi-conductive) peroxide-cured synthetic rubber, commonly referred to as EPDM (ethylene-propylene-dienemonomer). Consistent with embodiments described herein, outer jacket 120 may be formed of two different materials and in two distinction portions.

Figure 2:
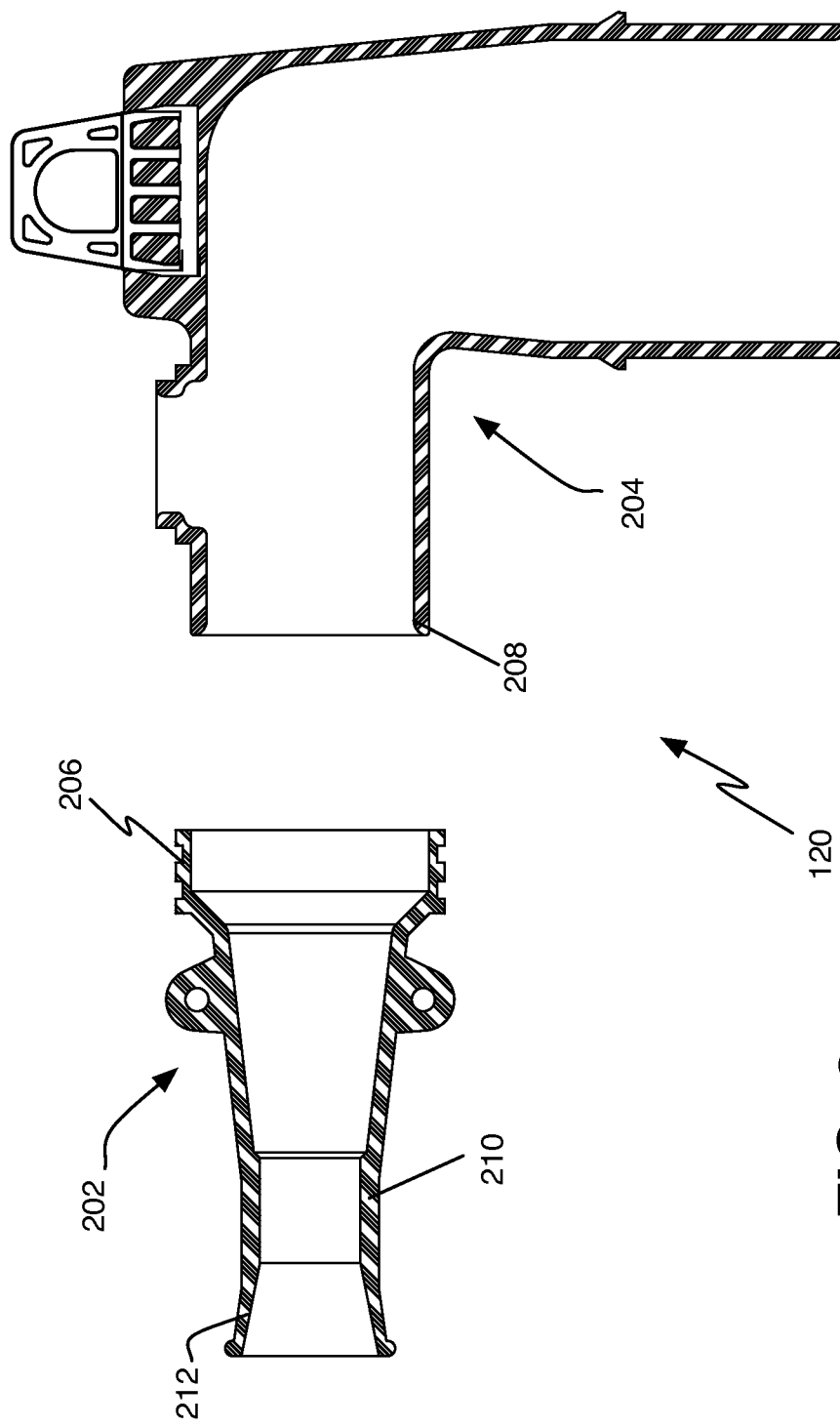
FIGS. 2-7 are side, cross-sectional views of the elbow connector of FIG. 1, during various stages of manufacture and installation.

In particular, as shown in FIG. 2, outer jacket 120 may include a cable receiving jacket portion 202 and a main body jacket portion 204. Cable receiving jacket portion 202 may be formed of a cold shrink capable EPDM or similar conductive polymeric material. Conversely, as described herein, main body jacket portion 204 may comprise a non-cold shrink material.

As used herein, the term "cold shrink capable" refers to the resilient and elastic material, such as rubber or plastic, that has a significant elastic recovery. That is, when the material is stretched or expanded, it will recover to nearly its original size when the cause of the stretching or expanding is removed. In some embodiments, non-EPDM materials having the same or similar elasticity characteristics may be used, such as silicone.

As shown in FIG. 2, cable receiving jacket portion 202 may include an annular mounting region 206 for mating with a corresponding opening 208 in main body jacket portion 204. For example, an inside diameter of annular mounting region 206 may be sized substantially equal to, or slightly less than, an outside diameter of opening 208 in main body jacket. In some implementations, annular mounting region 206 may have an axial length suitable for providing a minimum overlap "D" with main body jack portion 204 during manufacture of connector 100.

Cable receiving jacket portion 202 may also include a central engagement region 210 and a flared entrance region 212. As shown in FIG. 2, central engagement region 210 tapers radially inwardly from mounting region 206 in an axially rearward direction. At its most narrow portion, central engagement region 210 includes an inside diameter that is smaller than an inside diameter of opening 208 in main body jacket 204. In particular, consistent with embodiments described herein, the narrowest inside diameter of engagement region 210 is smaller than the outside diameter of the smallest gauge power cable for use therewith. Accordingly, as described below, during installation, engagement region 210 will collapse onto an outer surface of power cable 106 to secure the cable to connector 100 in a water/air tight manner.

Flared entrance region 212 tapers radially outwardly from central engagement region 210 in an axially rearward direction. Accordingly, an inside diameter of flared entrance region 212 is larger than an inside diameter of central engagement region 210. Such a configuration allows a removable core (e.g., core 502, shown in FIG. 5 and described below) to be more easily forcibly inserted into cable receiving jacket portion during a final stage of manufacture.

Returning to FIG. 1, as shown, within outer jacket 120, power cable elbow connector 100 may include a conductive or semi-conductive insert 122 that surrounds the connection portion of power cable 106 and bushing 110, and an insulative inner housing 124 formed between outer jacket 120 and insert 122. Inner housing 124 may be further molded or formed to provide at least a portion of bores 112/114, with insert 122 forming the remainder of bores 112/114.

In some implementations, each of insert 122 and inner housing 124 are made of cold-shrink capable materials. For example, each of insert 122 and inner housing 124 may be formed of a composition of EPDM having differing levels of carbon black, with conductive insert 122 having higher levels of carbon black than that of insulative inner housing 124. In other embodiments, insert 122 may be formed of an cold shrink capable EPDM material similar to that used in cable receiving jacket portion 202 and described above, while insulative inner housing 124 is formed of a resilient (e.g., high degree of elastic recovery) polymer, rubber, or epoxy material.

Figure 3:
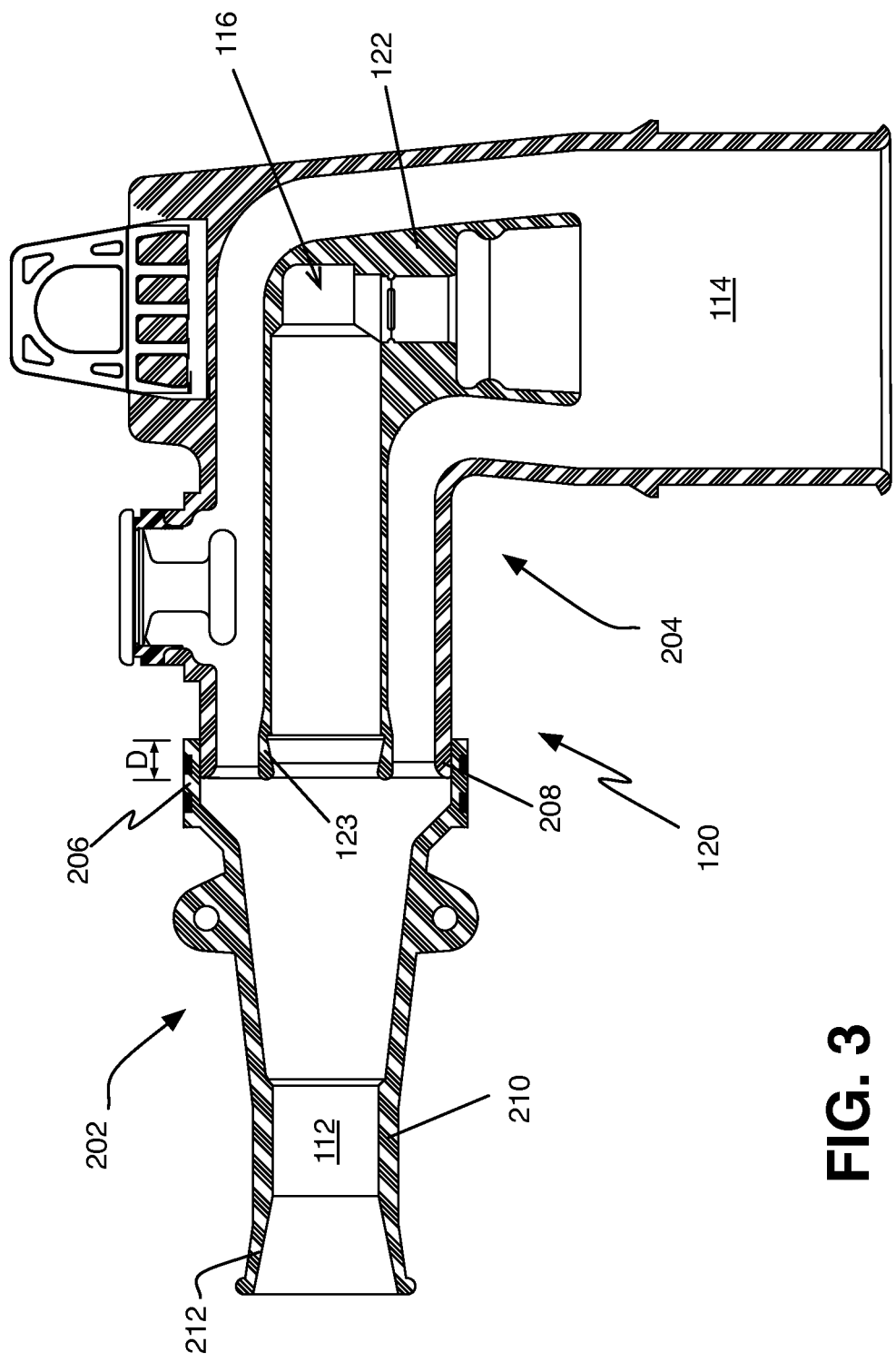

As shown in FIG. 3, in some embodiments, a rearward, cable receiving portion of insert 122 pay be provided with a core receiving portion 123. As described below, in relation to FIG. 5, during manufacture, core receiving potion 123 may be configured to receive a leading end of a support core to enable power cable 106 to be more easily received within insert 122 during installation of connector 100.

Consistent with embodiments described herein, during manufacture of power cable elbow connector 100, cable receiving jacket portion 202 is positioned on main body portion 204 and insert 122 is suspended (i.e., maintained in a spaced relationship relative to main body jacket portion 204), as shown in FIG. 3. In some embodiments, additional molding elements may be temporarily provided within outer jacket 120 to facilitate injection of insulative inner housing 124 and formation of bores 112 and 114 in connector 100.

Figure 4:
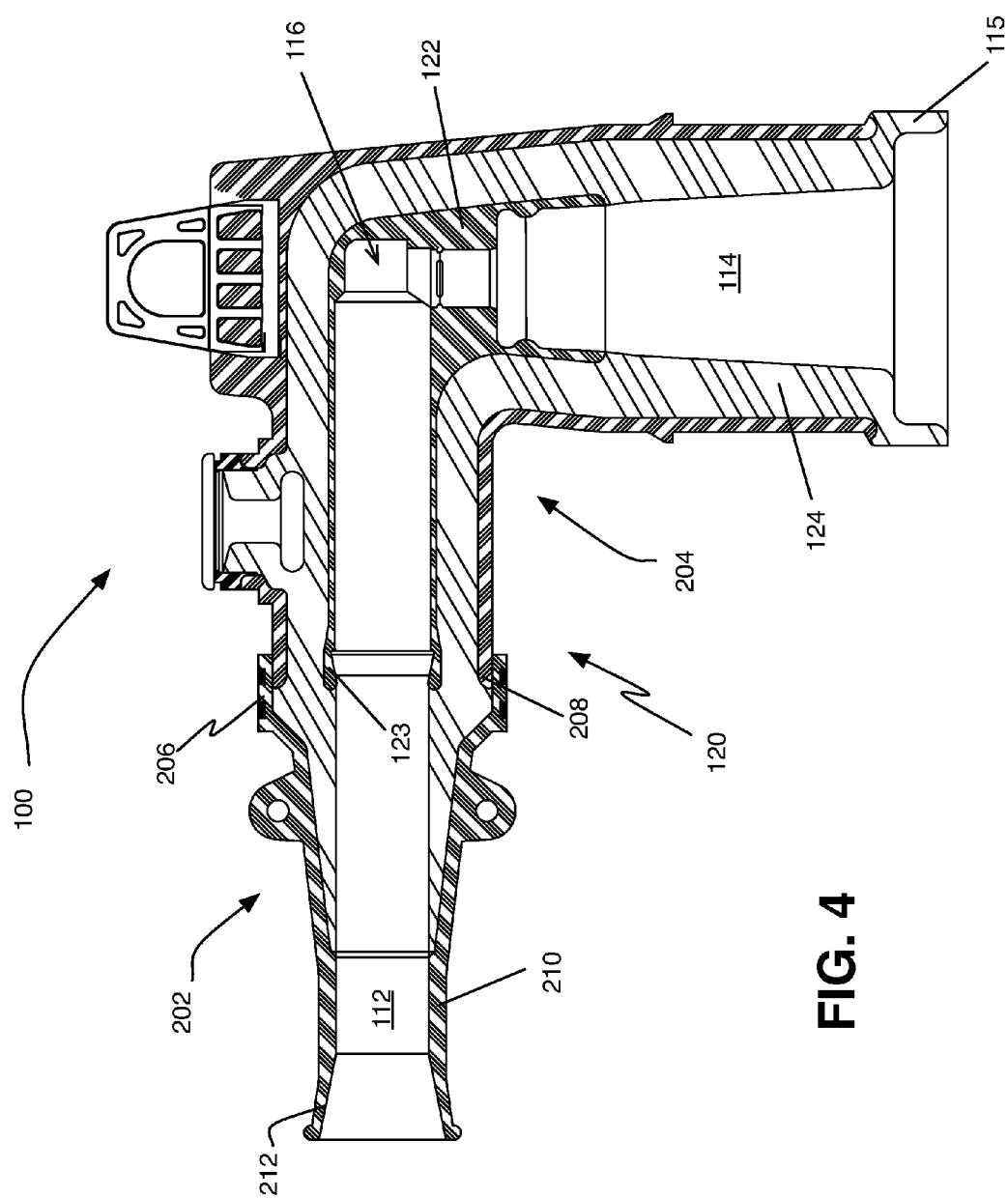

As shown in FIG. 4, insulative inner housing 124 may be formed by injecting the cold shrink capable insulative material between outer jacket 120 and conductive insert 122. As shown in FIG. 4, in an exemplary embodiment, at least a portion of insulative inner housing 124 is formed within both cable receiving jacket portion 202 and main body jacket portion 204 thereby permanently securing cable receiving jacket portion 202 to main body jacket portion 204.

As shown in FIG. 4, injection or formation of insulative inner housing 124 may also provide bore 114 and an interface with bushing 110. For example, the end of bore 114 adapted for receiving bushing 110 may be formed to include an elbow cuff 115 that provides an interference fit with a molded flange on bushing 110.

Returning to FIG. 1, in one exemplary implementation, power cable elbow connector 100 may include a voltage detection test point assembly 126 for sensing a voltage in connector 100. Voltage detection test point assembly 126 may be configured to allow an external voltage detection device, to detect and/or measure a voltage associated with connector 100.

For example, as illustrated in FIG. 1, voltage detection test point assembly 126 may include a test point terminal 128 embedded in a portion of insulative inner housing 124 and extending through an opening within outer jacket 120 (e.g., in main body jacket portion 204). In one exemplary embodiment, test point terminal 128 may be formed of a conductive metal or other conductive material. In this manner, test point terminal 128 may be capacitively coupled to the electrical conductor elements (e.g., power cable 106) within bore 112 in connector 100.

A test point cap 130 may sealingly engage a portion of test point terminal 128 and outer jacket 120. In one implementation, test point cap 130 may be formed of a semi-conductive material, such as EPDM to provide electrical continuity over an entire surface of connector 100, when cap 130 is installed on test point terminal 128. When test point terminal 128 is not being accessed, test point cap 130 may be mounted on test point assembly 126.

Consistent with embodiments described herein, main housing body 102 of power cable elbow connector 100 may also include a pull eye or tab 132 for facilitating removal of elbow connector 100 by a suitable tool, such as a hot stick or lineman's tool. As shown in FIG. 1, pull eye 132 may be integrated into outer jacket 120 (e.g., into main body jacket portion 202) in a region substantially in line with opposing bore 114.

Figure 5:
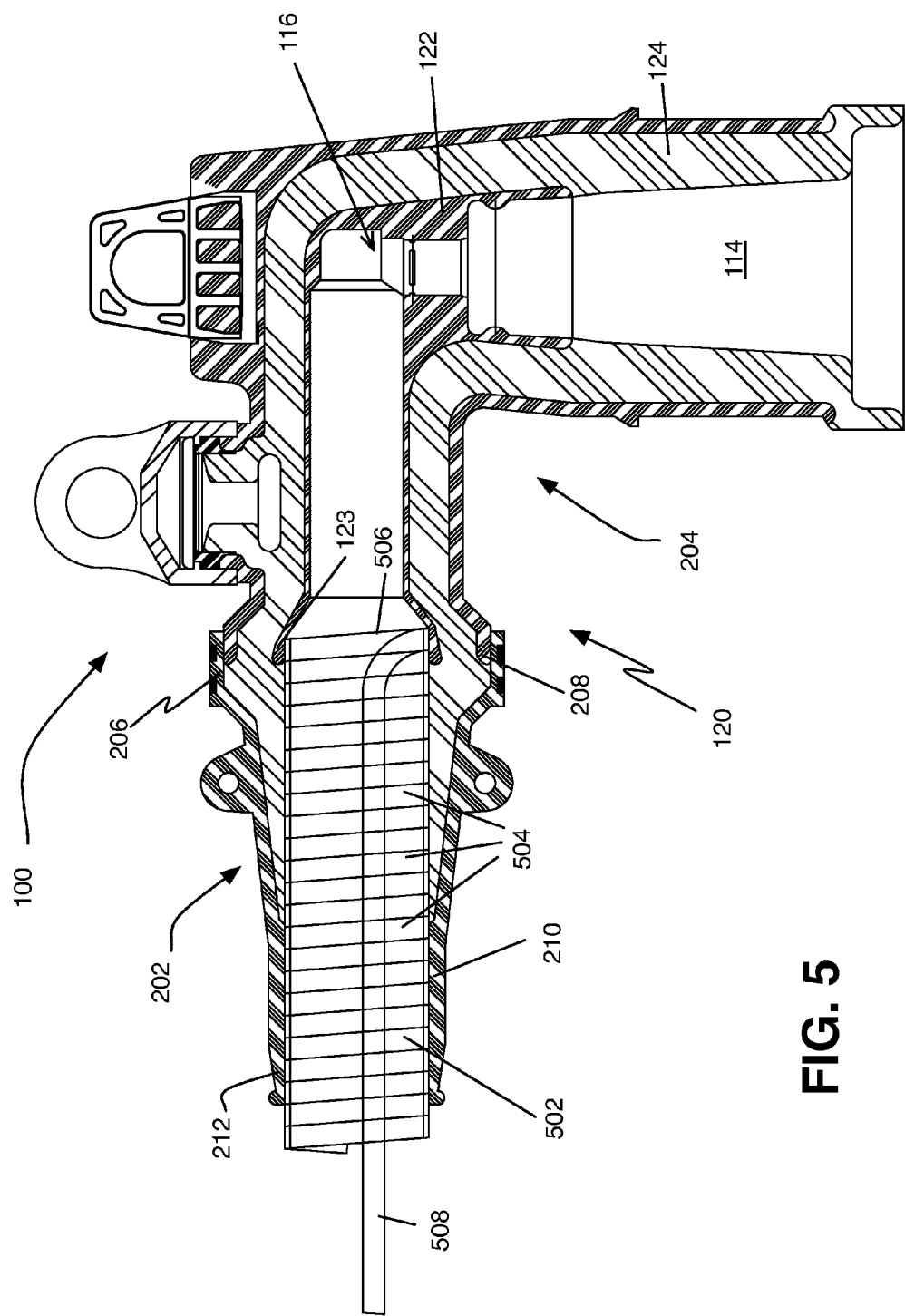

As shown in FIG. 5, during a final stage of manufacturing of power cable elbow connector 100 (i.e., before being provided to field installation personnel), a removable core 502 is inserted into connector 100 to facilitate field insertion of power cable 106 into connector 100. Because, as described above, the inside diameter of central engagement portion 210 of cable receiving jacket portion 202 is smaller than an outside diameter of power cable 106, removable core 502 is used to expand bore 112 to facilitate its insertion thereinto.

As shown in FIG. 5, one implementation of removable core 502 includes a nylon or polypropylene cord wound in a tubular configuration or a perforated or scored nylon/polypropylene tube having a uniform inside and outside diameter thereby creating multiple adjacent or overlapping coils 504. These adjacent coils 504 are molded or coupled together to maintain the tubular configuration of support core 502. Although adjacent coils 504 are preferably coupled together prior to insertion into connector 100, coils 504 may be separated, e.g., perforated or scored to facilitate later removal of core 502 from connector 100, as described below. However, in the formed or coupled state, core 502 is provided with enough structural rigidity to hold tubular bore 112 in a radially expanded state, as shown in FIG. 5.

During manufacture of connector 100, core 502 may be forcibly urged or inserted into bore 112 to cause portions of connector 100 to expand to facilitate receiving power cable 106. More specifically, a leading end 506 of core 502 may initially engage flared entrance region 212 of cable receiving jacket portion 202. Core 502 may then be urged into bore 112 in cable receiving jacket portion 202, insulative inner housing 124, and insert 122. More specifically, as shown in FIG. 5, core 502 may be configured to engage core receiving portion 123 of insert 122.

To facilitate removal of core 502, leading end 506 may be provided with a pull tab 508 coupled to the leading coil 504 in the core 502. When it is desired to remove core 502, an installer can pull tab 508, thus causing coils 504 to unravel until the entirety of core 502 is unraveled and may be removed from connector 100. As described below, once core 502 is removed from connector 100, the cold shrink nature of insulative inner housing 124, insert 122, and cable receiving jacket portion 202 causes these portions of connector 100 to collapse one cable 106, to secure cable 106 to connector 100.

In other implementations, core 502 may have other configurations, such as a fiberglass reinforced plastic to improve its strength, a multi-part solid (e.g., non-helical) core configured to separate from each other to facilitate removal from bore 112.

Figure 6:
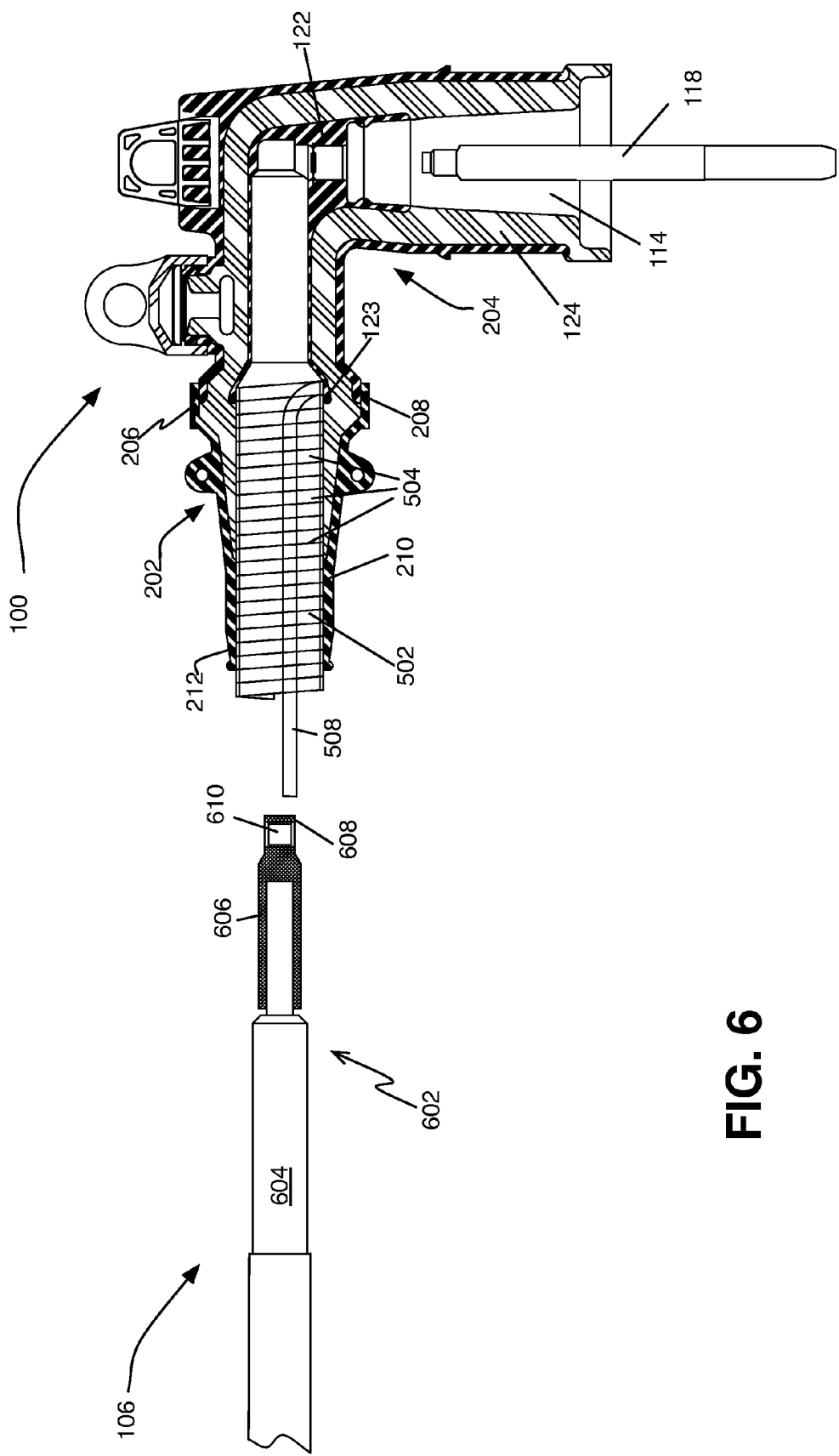
Figure 7:
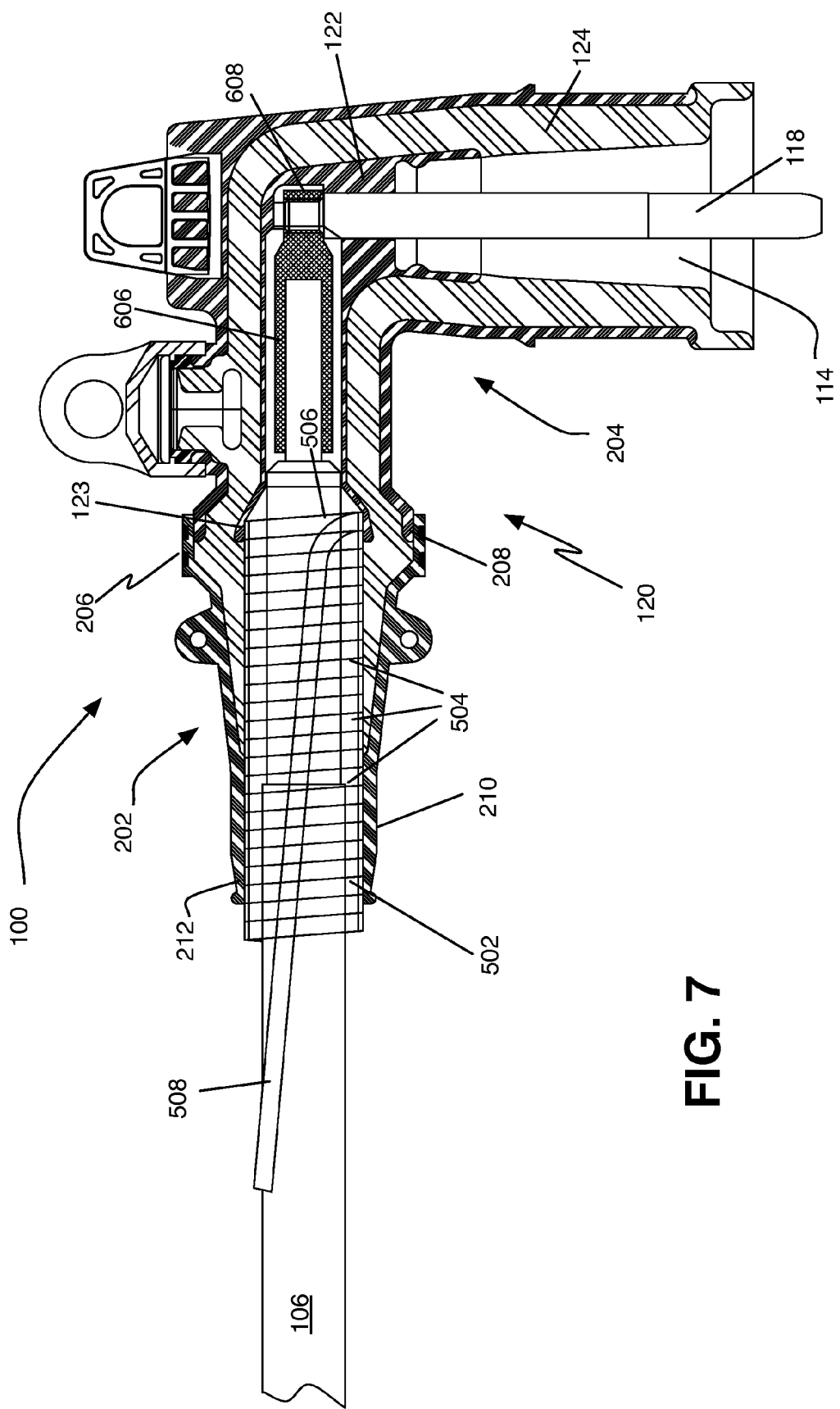

As shown in FIGS. 6 and 7, a prepared end of power cable 106 and bushing stud 118 may then be received within core 502/bore 112 and bore 114, respectively. For example, a forward end of power cable 106 may be prepared by connecting power cable 106 to a conductor spade assembly 602. More specifically, conductor spade assembly 602 may include a rearward sealing portion 604, a crimp connector portion 606, and a spade portion 608.

Rearward sealing portion 604 may include an insulative material surrounding a portion of power cable 106. When conductor spade assembly 602 is positioned within bore 112, and following removal of core 502, central engagement portion 210 of cable receiving jacket portion 202 may engage rearward sealing portion 604 to seal a bore 112 in connector 100.

Crimp connector portion 606 may include a substantially cylindrical conductive assembly configured to receive a center conductor of power cable 106 therein. Upon insertion of center conductor, crimp connector portion 606 may be crimped or otherwise secured to the center conductor.

Spade portion 608 may be conductively coupled to or integrated with crimp connector portion 606 and may extend axially therefrom. For example, in some implementations, spade portion 608 may be formed integrally with crimp connector portion 606 and be made of a conductive metal, such as steel, brass, aluminum, etc. As shown in FIG. 6, spade portion 608 includes a bore 610 extending perpendicularly therethrough for engaging an end of bushing stud 118. In some embodiments, bore 610 includes female threads and end of bushing stud 118 includes corresponding male threads.

During installation, power cable 106 is inserted through core 502 and into bore 112, with spade portion 608 extending into contact area 116 of connector 100, as shown in FIG. 7. Bushing stud 118 may then be received in bore 114 and engaged with spade portion 608 to conductively couple bushing stud 118 to power cable 106.

Once power cable 106 has been securely coupled to bushing stud 118 or bushing 110, core 502 may be removed in the manner described above (e.g., by pulling on pull tab 508 to unwind coils 504 of core 502). Upon removal of core 502, cold shrink portions of connector 100 expanded by core 502 are allowed to collapse (e.g. return to their pre-expanded states and/or collapse to an even smaller size/shape) to engage power cable 106 in connector 100 in an air and water tight manner. For example, central engagement portion 210, a rearward portion of insulative inner housing 124, and core receiving portion 123 of insert 122 may all be configured to collapse onto rearward sealing portion 604 (e.g., outer insulator) of power cable 106 upon removal of core 502.

In contrast, because main body jacket portion 204 is not formed from cold shrink capable material, increased rigidity and reduced manufacturing cost of main body jacket portion 204 may be realized, resulting a higher hoop force being applied to the interference friction fit between bushing 110 and cuff 115 in bore 114.

Figure 8:
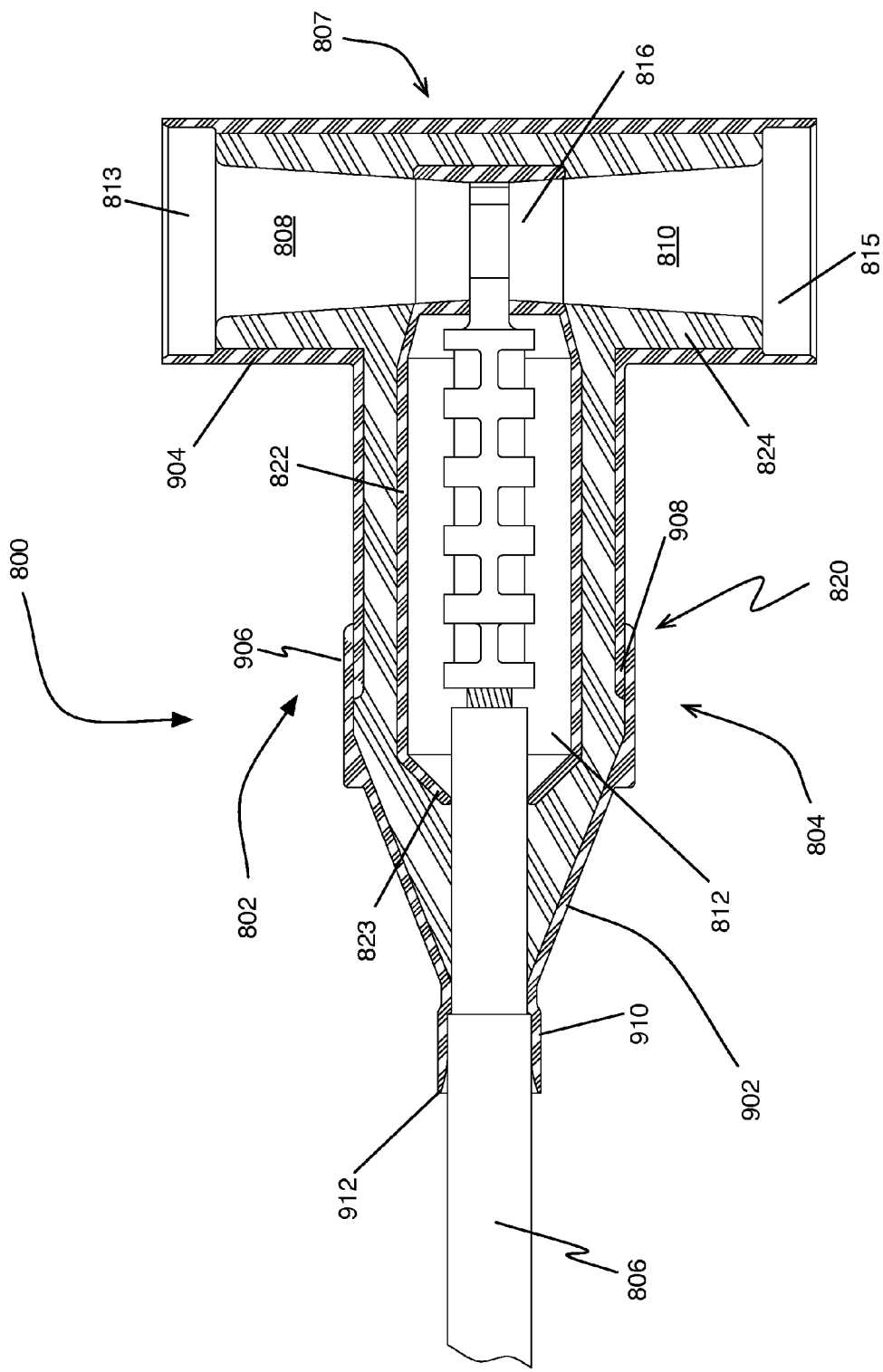
FIG. 8 is a schematic cross-sectional diagram illustrating another embodiment of a power cable elbow connector configured in a manner consistent with implementations described herein.

FIG. 8 is a schematic cross-sectional diagram illustrating a power cable elbow connector 800 configured in a manner consistent with implementations described herein. FIGS. 9-13 are side, cross-sectional views of elbow connector 800 during various stages of manufacture and installation. As shown in FIG. 1, power cable elbow connector 100 may include a 600-amp elbow connector having a main housing body 802 and that includes a cable receiving end 804 for receiving a power cable 806 therein and a connector T-end 807 that includes opposing bores 808/810 for receiving equipment bushings, such as a deadbreak or loadbreak transforming bushings, insulating plugs, voltage arrestors, or other high or medium voltage equipment.

As shown, cable receiving end 804 may extend along a main axis of connector 800 and may include a bore 812 extending therethrough. In some implementations, openings 808/810 of connector T-end 807 project substantially perpendicularly from the axial direction of cable receiving end 804 in opposing directions. A contact area 816 may be formed at the confluence of bores 812, 808, and 810 for enabling power cable 806 to conductively couple with connected equipment (e.g., connected to T-end 807).

Power cable elbow connector 800 may include an electrically conductive outer jacket 820 formed from, for example, a conductive EPDM. Consistent with embodiments described herein, outer jacket 820 may be formed of two different materials and in two distinction portions.

Figure 9:
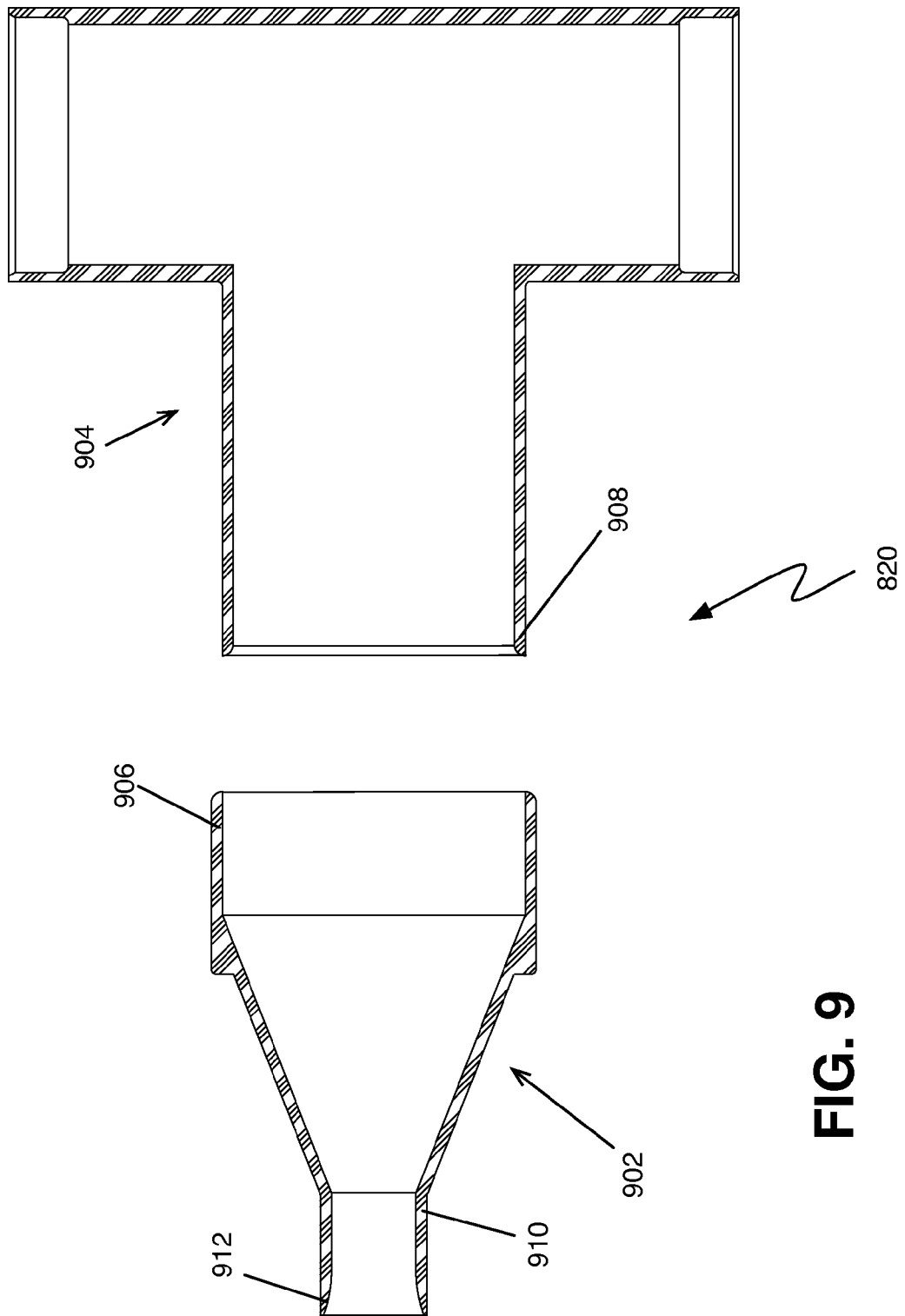
FIGS. 9-12 are side, cross-sectional views of the elbow connector of FIG. 8, during various stages of manufacture and installation.

In particular, as shown in FIG. 9, outer jacket 820 may include a cable receiving jacket portion 902 and a main body jacket portion 904. Cable receiving jacket portion 902 may be formed of a cold shrink capable EPDM or similar conductive polymeric material. Conversely, as described herein, main body jacket portion 904 may comprise a non-cold shrink material.

As shown in FIG. 9, cable receiving jacket portion 902 may include an annular mounting region 906 for mating with a corresponding opening 908 in main body jacket portion 904. For example, an inside diameter of annular mounting region 906 may be sized substantially equal to, or slightly less than, an outside diameter of opening 908 in main body jacket. In some implementations, annular mounting region 906 may have an axial length suitable for providing a minimum overlap with main body jack portion 904 during manufacture of connector 800.

Cable receiving jacket portion 902 may also include a central engagement region 910 and an entrance region 912. As shown in FIG. 9, central engagement region 910 tapers radially inwardly from mounting region 906 in an axially rearward direction. At its most narrow portion, central engagement region 910 includes an inside diameter that is smaller than an inside diameter of opening 908 in main body jacket 904. In particular, consistent with embodiments described herein, the narrowest inside diameter of engagement region 910 is smaller than the outside diameter of the smallest gauge power cable for use therewith. Accordingly, as described below, during installation, engagement region 910 will collapse onto an outer surface of power cable 806 to secure the cable to connector 800 in a water/air tight manner.

As shown in FIG. 9, entrance region 912 includes an inside surface that tapers radially outwardly from central engagement region 910 in an axially rearward direction. Accordingly, an inside diameter of a rearward end of entrance region 912 is larger than an inside diameter of central engagement region 910. Such a configuration allows a removable core (e.g., core 1102, shown in FIG. 11 and described below) to be more easily forcibly inserted into cable receiving jacket portion 902 during a final stage of manufacture.

Returning to FIG. 8, as shown, within outer jacket 820, power cable elbow connector 800 may include a conductive or semi-conductive insert 822 that surrounds contact area, and an insulative inner housing 824 formed between outer jacket 820 and conductive insert 822. Inner housing 824 may be further molded or formed to provide at least a portion of bores 808, 810, and 812, with insert 822 forming the remainder of bores 808-812, as shown in FIG. 10.

In some implementations, each of insert 822 and inner housing 824 are made of cold-shrink capable materials. For example, each of insert 822 and inner housing 824 may be formed of a composition of EPDM having differing levels of carbon black, with conductive insert 822 having higher levels of carbon black than that of insulative inner housing 824. In other embodiments, insert 822 may be formed of an cold shrink capable EPDM material similar to that used in cable receiving jacket portion 902 and described above, while insulative inner housing 824 is formed of a resilient (e.g., high degree of elastic recovery) polymer, rubber, or epoxy material.

Figure 10:
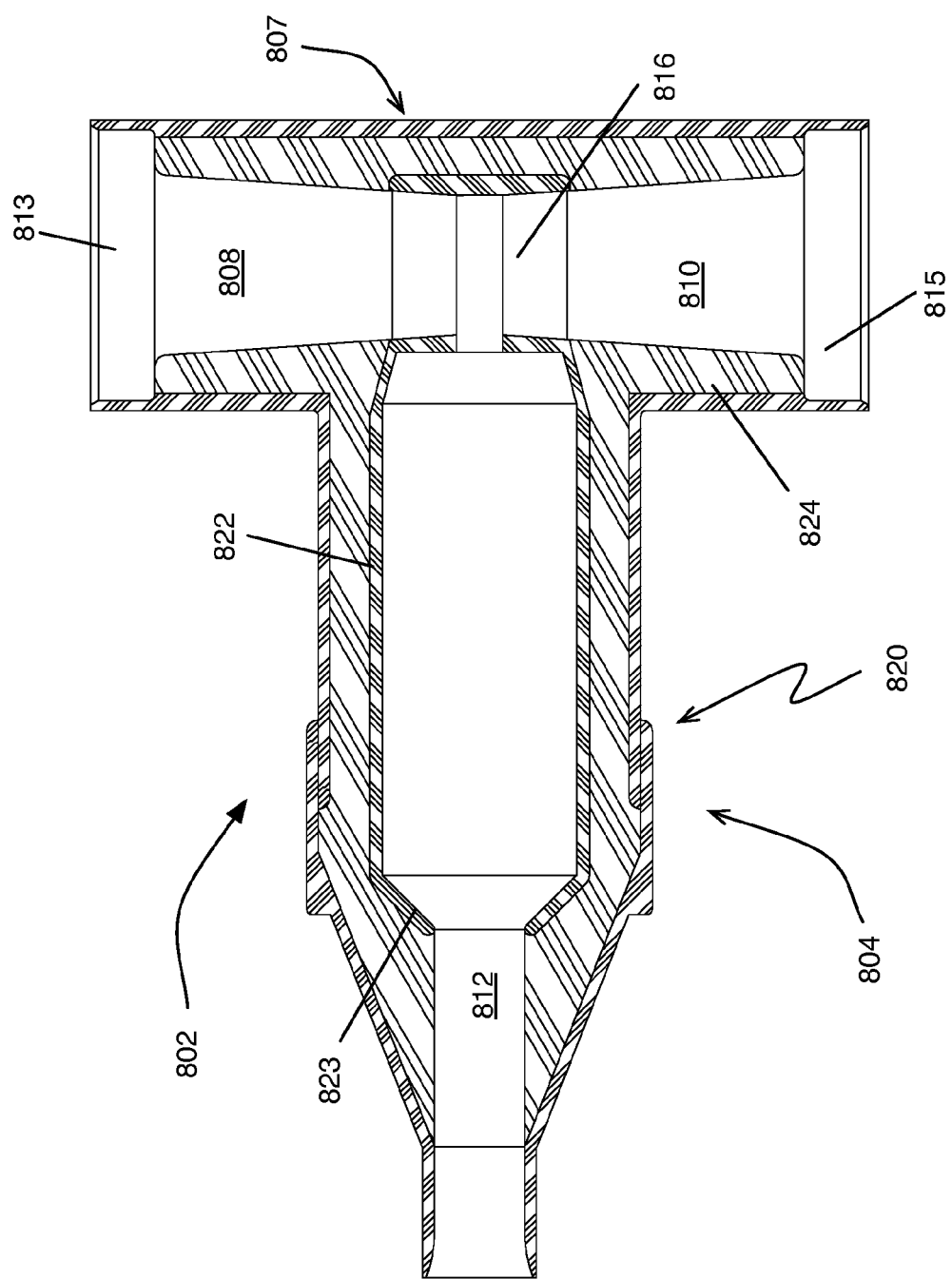

As shown in FIG. 10, in some embodiments, a rearward, cable receiving portion of insert 822 may be provided with a core receiving portion 823. As described below, in relation to FIG. 11, during manufacture, core receiving potion 823 may be configured to receive a leading end of support core 1102 to enable power cable 806 to be more easily received within insert 822 during installation of connector 100.

Consistent with embodiments described herein, during manufacture of power cable elbow connector 800, cable receiving jacket portion 902 is positioned on main body portion 904 and insert 822 is suspended (i.e., maintained in a spaced relationship relative to main body jacket portion 904), as shown in FIG. 10. In some embodiments, additional molding elements may be temporarily provided within outer jacket 820 to facilitate injection of insulative inner housing 824 and formation of bores 808-812 in connector 800.

In some embodiments, insulative inner housing 824 may be formed by injecting the cold shrink capable insulative material between outer jacket 820 and conductive insert 822. As shown in FIG. 10, in an exemplary embodiment, at least a portion of insulative inner housing 824 is formed within both cable receiving jacket portion 902 and main body jacket portion 904, thereby permanently securing cable receiving jacket portion 902 to main body jacket portion 904.

As shown in FIG. 10, injection or formation of insulative inner housing 824 may also provide interface regions at respective ends of openings 808 and 810 in T-end 807. For example, openings 808 and 810 in inner housing 824 may be formed to as elbow cuffs 813 and 815, respectively, to thus provide an interference fit with a molded flange of a connected component (e.g., bushing, plug, etc.).

Figure 11:
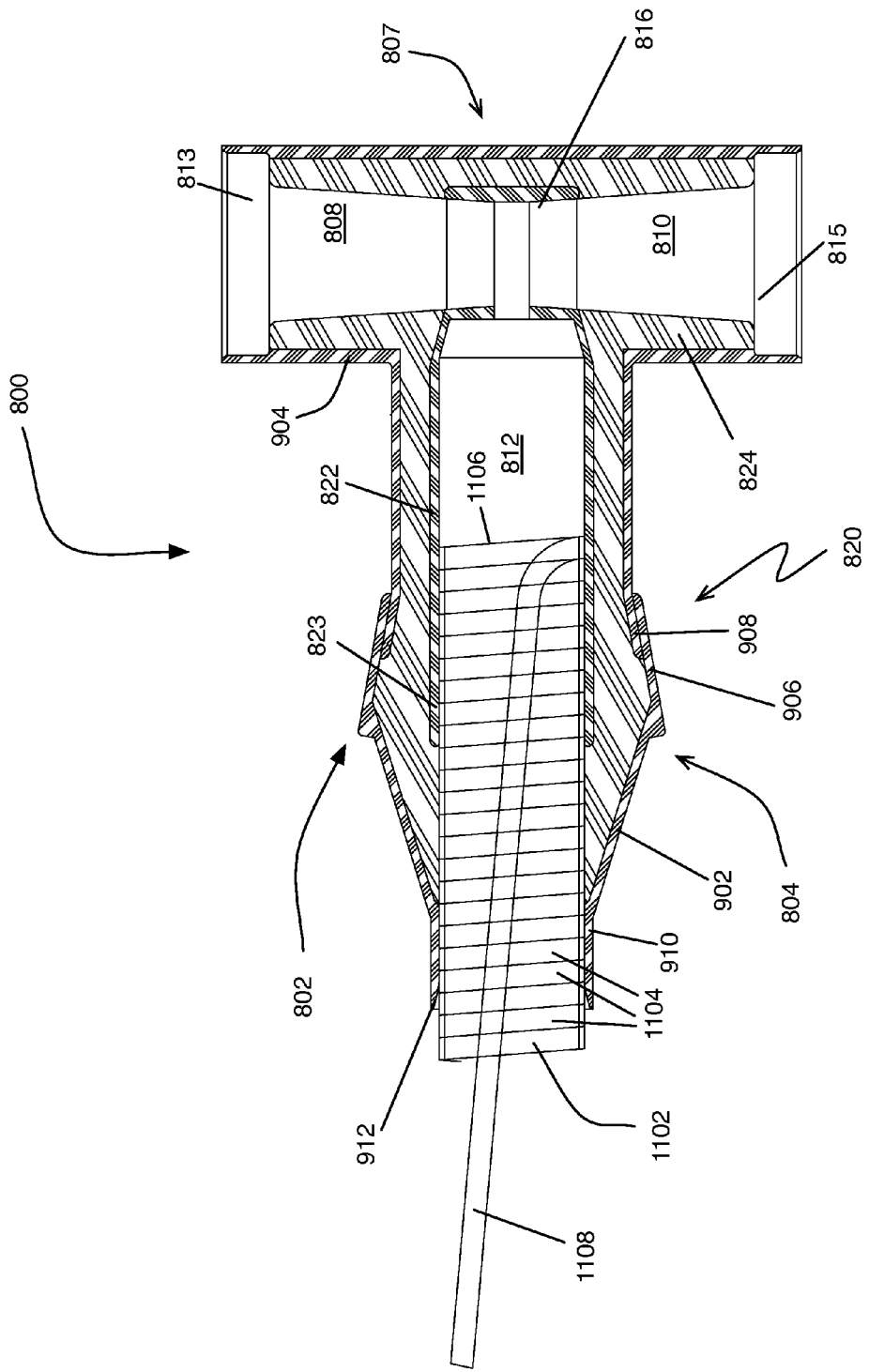

As shown in FIG. 11, during a final stage of manufacturing of power cable elbow connector 800 (i.e., before being provided to field installation personnel), a removable core 1102 is inserted into connector 800 to facilitate field insertion of power cable 806 into connector 800. Because, as described above, the inside diameter of central engagement portion 910 of cable receiving jacket portion 902 is smaller than an outside diameter of power cable 806, removable core 1102 is used to expand bore 812 to facilitate its insertion thereinto.

As shown in FIG. 11, similar to core 502 described above, removable core 1102 may include a nylon or polypropylene tube perforated or scored in a helical manner to include multiple adjacent coils 1104. During manufacture of connector 800, core 1102 is forcibly urged into bore 812 to cause portions of connector 800 to expand to facilitate receiving power cable 806. More specifically, a leading end 1106 of core 1102 may initially engage entrance region 912 of cable receiving jacket portion 902. Core 1102 may then be urged into bore 812 in cable receiving jacket portion 902, insulative inner housing 824, and insert 822. More specifically, as shown in FIG. 11, core 1102 may be configured to engage core receiving portion 823 of insert 822.

To facilitate removal of core 1102, leading end 1106 may be provided with a pull tab 1108 coupled to the leading coil 1104 in the core 1102. When it is desired to remove core 1102, an installer can pull tab 1108, thus causing coils 1104 to unravel until the entirety of core 1102 is unraveled and may be removed from connector 800.

In other implementations, core 1102 may have other configurations, such as a fiberglass reinforced plastic to improve its strength; a multi-part solid (e.g., non-helical) core configured to separate from each other to facilitate removal from bore 812.

Figure 12:
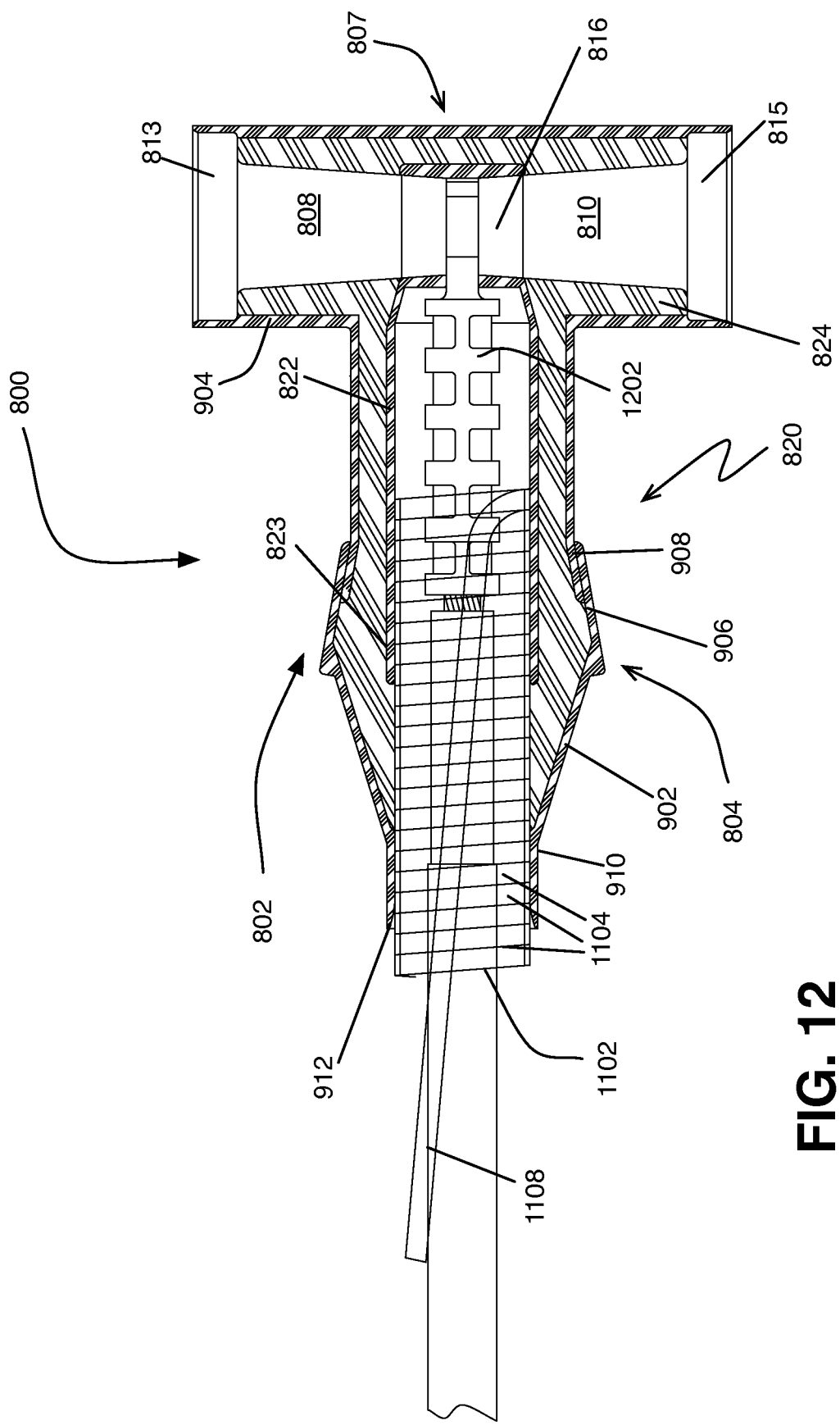

As shown in FIG. 12, a prepared end of power cable 806 may be received within core 1102/bore 812. For example, a forward end of power cable 806 may be prepared by connecting power cable 806 to include a conductor spade assembly 1202, similar to the conductor spade assembly 602 described above with respect to FIGS. 6 and 7, although other configurations of power cable ends may be enabled consistent with embodiments described herein. During installation, power cable 806 is inserted through core 1102 and into bore 812, Once power cable 806 has been fully inserted into connector 800, and/or connected to one or more other devices via bores 810 or 812, such as a bushing, etc., core 1102 may be removed in the manner described above (e.g., by pulling on pull tab 1108 to unwind coils 1104). Upon removal of core 1102, cold shrink portions of connector 800 expanded by core 1102 are allowed to collapse (e.g. return to their pre-expanded states) to engage power cable 806 in connector 800 in an air and water tight manner. For example, central engagement portion 910, a rearward portion of insulative inner housing 824, and core receiving portion 823 of insert 822 may all be configured to collapse onto a portion (e.g., an outer insulator) of power cable 806 upon removal of core 1102.

In contrast, because main body jacket portion 904 is not formed from cold shrink capable material, increased rigidity and reduced manufacturing cost of main body jacket portion 904 may be realized, resulting in a stiffer, interference friction fit between connector 800 and equipment coupled to T-end 807.

The foregoing description of exemplary implementations provides illustration and description, but is not intended to be exhaustive or to limit the embodiments described herein to the precise form disclosed. Modifications and variations are possible in light of the above teachings or may be acquired from practice of the embodiments. For example, although exemplary 200-amp and 600-amp connectors have been described above, implementations described herein may also be used in conjunction with other devices, such as high voltage switchgear equipment, including 15 kV, 25 kV, or 35 kV equipment.

Although the invention has been described in detail above, it is expressly understood that it will be apparent to persons skilled in the relevant art that the invention may be modified without departing from the spirit of the invention. Various changes of form, design, or arrangement may be made to the invention without departing from the spirit and scope of the invention. Therefore, the above-mentioned description is to be considered exemplary, rather than limiting, and the true scope of the invention is that defined in the following claims.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. An electrical elbow connector assembly configured to couple a power cable and an equipment bushing, comprising:
    a housing body that includes an outer jacket, an insert portion, and an insulative inner housing positioned between at least a portion of the outer jacket and the insert portion,
    wherein the housing body forms a first bore for receiving the power cable and a second bore for receiving the equipment bushing, wherein the second bore is perpendicular to and in communication with the first bore,
    wherein the outer jacket comprises:
        a cable receiving jacket portion proximate the first bore, and
        a main body jacket portion proximate to at least the second bore,
    wherein the main body jacket is formed separately from and comprising a different material than the cable receiving jacket portion,
    wherein at least a portion of the cable receiving jacket portion is configured to engage the power cable received into the housing body,
    wherein the cable receiving jacket portion comprises a cold shrink material configured to securely engage the power cable,
    wherein the main body jacket portion comprises a non-cold shrink material to ensure a sufficient hoop force between the main body jacket portion and the equipment bushing, and
    wherein the cable receiving jacket portion of the outer jacket comprises a mounting region configured to engage the main body jacket portion at an interface between the cable receiving jacket portion and the main body jacket portion.

2. The electrical elbow connector assembly of claim 1, wherein the cable receiving jacket portion of the outer jacket comprises an engagement region having an inside diameter less than the outside diameter of the power cable.

3. The electrical elbow connector assembly of claim 2, wherein the cable receiving jacket portion of the outer jacket comprises an entrance region having an inside diameter larger than the inside diameter of the engagement region.

4. The electrical elbow connector assembly of claim 2, wherein the cable receiving jacket portion of the outer jacket is configured to receive a removable expansion core therein,
    wherein the removable expansion core comprises a tubular member having an outside diameter larger than the inside diameter of the engagement region, wherein the removable expansion core is configured to receive the power cable therethrough.

5. The electrical elbow connector assembly of claim 4, wherein the tubular member of the removable expansion core is perforated or scored in a helical pattern for unwinding to remove from the cable receiving jacket portion.

6. The electrical elbow connector assembly of claim 4, wherein the removable expansion core comprises a pull tab connected to a leading end of the core to facilitate unwinding of the removable expansion core.

7. The electrical elbow connector assembly of claim 1, wherein the insulative inner housing and the insert portion each comprise a cold sink capable material.

8. The electrical elbow connector assembly of claim 1, wherein the cable receiving jacket portion comprises a cold shrink capable ethylene-propylene-dienemonomer (EPDM) material and the main body jacket portion comprises a non cold shrink EPDM material.

9. The electrical elbow connector assembly of claim 1, comprising a 200-amp or a 600-amp connector.

10. The electrical elbow connector assembly of claim 1, wherein the housing body comprises:
    a cable receiving end that includes the first bore for receiving the power cable; and
    a connector end that projects perpendicularly from the cable receiving end and that includes the second bore that communicates with a forward end of the first bore.

11. An electrical connector assembly, comprising:
    a housing body having a cable receiving end and a connector end,
    wherein the cable receiving end includes a first longitudinal bore extending therethrough for receiving a power cable therein,
    wherein the connector end projects perpendicularly from the cable receiving end and includes a second bore that communicates with a forward end of the first longitudinal bore,
    wherein the housing body comprises an outer jacket having a cable receiving jacket portion and a main body jacket portion,
    wherein the main body jacket portion is formed separately from and comprises a different material than the cable receiving jacket portion,
    wherein the cable receiving jacket portion comprises a cold shrink material, wherein the main body jacket portion comprises a non-cold shrink material to ensure a sufficient hoop force between the main body jacket portion and the equipment bushing, and wherein the cable receiving jacket portion comprises a mounting region configured to engage the main body jacket portion.

12. The electrical connector assembly of claim 11, wherein the cable receiving jacket portion comprises an engagement region configured to engage the power cable, wherein the engagement region includes an inside diameter smaller than an outside diameter of the power cable.

13. The electrical connector assembly of claim 12, wherein the cable receiving end is configured to receive a removable tubular expansion core in the longitudinal bore in a region proximate to the cable receiving jacket portion of the outer jacket, wherein tubular expansion core includes an inside diameter sufficient to accommodate insertion of the power cable therethrough.

14. The electrical connector assembly of claim 13, wherein removal of the tubular expansion core causes the cable receiving jacket portion to collapse inwardly to engage the power cable.

15. The electrical connector assembly of claim 13, wherein the housing body comprises an insert portion and an insulated inner housing formed between the insert portion and the outer jacket, wherein each of the insert portion and the insulated inner housing comprise cold shrink capable materials, and wherein at least a portion of the insert portion and the insulated inner housing are configured to engage the tubular expansion core during insertion of the tubular expansion core into the longitudinal bore.

* * * * *